United States Patent [19]

Hecht

[11] 4,354,315
[45] Oct. 19, 1982

[54] MEASURING ARRANGEMENT PROVIDED AT A ROLLER WAY FORMED BY ROTATABLY MOUNTED ROLLERS AS WELL AS A METHOD OF EVALUATING THE MEASURED VALUES

[75] Inventor: Hans Hecht, Linz, Austria

[73] Assignee: Voest-Alpine Aktiengesellschaft, Linz, Austria

[21] Appl. No.: 214,130

[22] Filed: Dec. 8, 1980

[30] Foreign Application Priority Data

Jan. 25, 1980 [AT] Austria .................................. 414/80

[51] Int. Cl.³ ............................ G01B 7/14; G01B 7/31
[52] U.S. Cl. ................................. 33/182; 33/174 L; 33/174 Q
[58] Field of Search ............ 33/143 L, 147 K, 147 L, 33/147 M, 174 L, 174 Q, 182

[56] References Cited

U.S. PATENT DOCUMENTS

| | | | |
|---|---|---|---|
| 3,962,794 | 6/1976 | Kima et al. | 33/182 |
| 4,084,324 | 4/1978 | Whitehouse | 33/174 L |
| 4,087,918 | 5/1978 | Schmid et al. | 33/143 L |
| 4,132,003 | 1/1979 | Schrewe et al. | 33/182 |
| 4,176,462 | 12/1979 | Hölter et al. | 33/182 |
| 4,178,692 | 12/1979 | Schultz | 33/182 |
| 4,294,305 | 10/1981 | Oda | 33/182 |
| 4,295,278 | 10/1981 | Gloor | 33/182 |

FOREIGN PATENT DOCUMENTS

| | | | |
|---|---|---|---|
| 7201336 | 9/1972 | France. | |
| 7526973 | 9/1975 | France. | |
| 55-50103 | 4/1980 | Japan | 33/147 N |

Primary Examiner—Richard R. Stearns
Attorney, Agent, or Firm—Brumbaugh, Graves, Donohue & Raymond

[57] ABSTRACT

A measuring arrangement at a roller way formed by rotatably mounted rollers includes a supporting body movable along the roller way and thus setting the rollers in rotation. At the supporting body, sensors are arranged which coact with the surface areas of the rollers and measure the distance between the surface areas of the rollers and a neutral line provided within the supporting body. In order to be able to find out distorted or eccentrically mounted rollers by continuously moving through the measuring arrangement, the supporting body, on the side facing the roller way, has at least three sensors arranged at a distance from one another in the direction parallel to the moving direction of the supporting body. The sensors measure the surface area of a roller in subsequent angular positions.

8 Claims, 5 Drawing Figures

MEASURING ARRANGEMENT PROVIDED AT A ROLLER WAY FORMED BY ROTATABLY MOUNTED ROLLERS AS WELL AS A METHOD OF EVALUATING THE MEASURED VALUES

BACKGROUND OF THE INVENTION

The invention relates to a measuring arrangement provided at a roller way formed by rotatably mounted rollers, in particular at a continuous casting plant including oppositely arranged strand guiding rollers, which measuring arrangement comprises a supporting body movable along the roller way thus setting the rollers in rotation and on which sensors are arranged, which coact with the surface areas of the rollers and measure the distance between the surface areas of the rollers and a neutral line provided within the supporting body.

There are known measuring arrangements for roller ways of continuous casting plants (German Offenlegungsschrift No. 2,427,895) comprising a supporting body in which sensors are arranged whose tracing pins are brought into contact with the surface areas of the strand guiding rollers when moving the measuring arrangement to pass by the strand guiding rollers. In this manner, the distance between two oppositely arranged rollers can be measured, the measured distance corresponding to the distance between the two surface points of the two rollers, which the sensors each contact.

Due to the high strains exerted by the cast strand onto the strand guiding rollers, it may occur that the rollers get distorted. With the measuring arrangement according to German Offenlegungsschrift No. 2,427,895, it is not possible to differentiate whether a roller has become distorted, or whether the positions of the roller bearings are incorrect.

Furthermore, a measuring arrangement is known (German Pat. No. 2,639,240) with which it is possible to check the truth of running of a roller. With this measuring arrangement a drivable roller is provided which, after having contacted a roller to be measured, will drive the same, a sensor arranged beside this drivable roller measuring inaccuracies in the truth of running. The installation of a driven roller into such a measuring arrangement is very complex. A further disadvantage of this measuring arrangement is that it can be moved through the strand guide not continuously, but stepwise from roller to roller.

SUMMARY OF THE INVENTION

The present invention has as its object to eliminate the disadvantages and difficulties described and to provide a measuring arrangement with which it is possible to check the truth of running of the rollers of a roller way, i.e., to detect distorted or eccentrically mounted rollers while the arrangement is continuously moved along the roller way, and which arrangement is assembled in a very simple and operationally safe manner.

This object is achieved according to the invention in that the supporting body comprises, on the side facing the roller way, at least three sensors arranged in a spaced-apart manner in the direction parallel to the moving direction of the supporting body and measuring the surface area of a roller in subsequent angular positions of the roller.

The measuring arrangement can be moved along the roller way with the help of ropes or chains. When using the measuring arrangement in a continuous casting plant, it can be coupled to a starter bar and moved through the strand guide with the help of driving rollers provided in the strand guide.

If the measuring arrangement is passed by a roller with a "run-out," the sequence of the points of contact of a roller surface with the supporting body represents a line similar to a sinusoidal line, seen from the supporting body, i.e. from its neutral line. However, if the supporting body is passed by an accurately true-running roller, the sequence of the points of contact of the roller surface with the supporting body of this roller represents a straight line (also seen from the neutral line of the supporting body). With the help of the three sensors it is possible to clearly differentiate the sinusoidal line from the straight line: If the measured values taken by the sensors are all equal, the roller is running true, but if the measured values differ from one another, this suggests a roller with a "run-out."

In order that the measuring operation is not unnecessarily comprehensive, preferably only three sensors are arranged at the supporting body.

In order to do with a narrow supporting body, it is advantageous to arrange the sensors one after the other along a line that is parallel to the moving direction of the supporting body. This, moreover, has the advantage that the eccentricity for a very special cross-sectional spot of a roller may be checked.

For evaluating the measured values, it is advantageous if the distance from the first sensor to the third one is smaller than the roller distance of two neighbouring rollers of a roller way, since in that case three successively measured values each belong to one and the same roller.

The distance between two subsequently arranged sensors suitably is to be unequal to half of the roller circumference, if possible, since otherwise it may happen in a particularly unfavorable case that all the three sensors coincide in one node of the sinusoidal-like line representing the sequence of the points of contact between the surface of the distorted roller and the supporting body. It is particularly advantageous if the distance between the first sensor and the last is 90% of the distance between two neighbouring rollers at the most, as well as 90% of the circumference of a roller at the most.

According to a preferred embodiment, the supporting body comprises a steel strip as the neutral line, on both sides of which three sensors are each arranged, wherein each of the sensors of one side is connected, with its end facing away from the steel strip, with a further steel strip, and wherein furthermore pressure elements are each provided between the outer steel strip and the steel strip that represents the neutral line, which press the steel strips apart.

Suitably, one of the sensors of either side is rigidly connected with the steel strip representing the neutral line and the other sensors are articulately connected with this steel strip, whereas all the sensors are articulately connected with the outer steel strips.

The invention furthermore relates to a method by which it is possible to determine simultaneously the extent of the eccentricity of a roller and the offset of the position of the rotation axis of a roller relative to the theoretically ideal position, which method is characterized in that the measured values established by the three sensors are converted into digital values in an analog to digital converter, the peaks are determined and input into a computer, which, on solving a system of three equations with three variables, calculates the value of the true-running error and the deviation of the position of the rotation axis of the roller from the theoretically correct position.

BRIEF DESCRIPTION OF THE DRAWINGS

The invention will now be explained in more detail by way of two schematically illustrated exemplary embodiments with reference to the accompanying drawings, wherein.

DETAILED DESCRIPTION OF EXEMPLARY EMBODIMENTS

Figure 1:
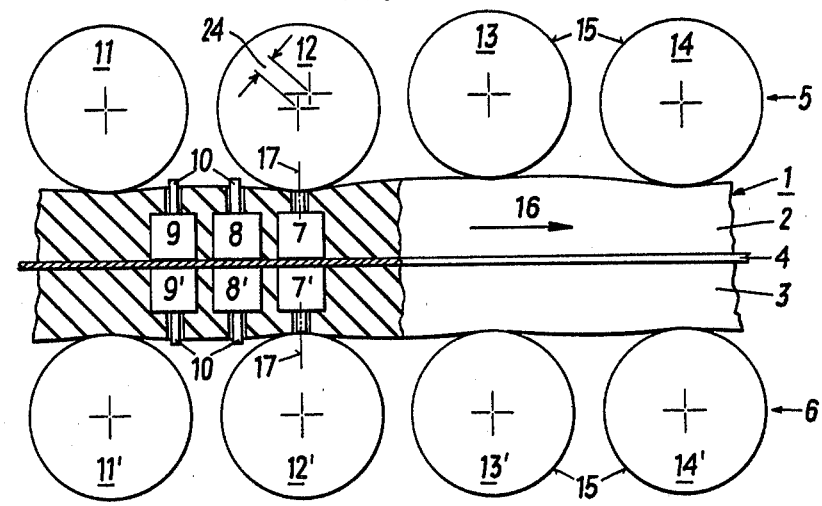
FIG. 1 is a measuring arrangement in section between two roller ways of a continuous casting plant.

A supporting body 1 of a measuring arrangement, according to the embodiment illustrated in FIG. 1, comprises elastically deformable synthetic strands 2, 3 between which an elastically deformable steel strip 4 representing the neutral line of the supporting body 1 is inserted. This supporting body 1, only a section of which is drawn in FIG. 1, is coupled to a starter bar (not illustrated) which is moved through the strand guide formed by oppositely arranged roller ways 5, 6 with the help of driving strands. To this steel strip, six sensors are fastened, which are preferably designed as inductive distance transducers 7, 7', 8, 8', 9, 9'. The mounting of the distance transducers is effected in a manner that their tracing pins 10, which contact the rollers 11 to 14 and 11' to 14', respectively, i.e., with the surface areas 15 of these rollers, will move at right angles to the plane of the steel strip 4. The distance transducers 7, 8 and 9 are fastened to the upper side of the steel strip 4 and their tracing pins 10 are brought into contact with the upper strand guiding rollers 11 to 14 of the roller way 5, one after the other, when the measuring arrangement is moved in the direction of the arrow 16 along the roller ways 5, 6. In an analogous manner, the distance transducers 7', 8' and 9' are fastened to the lower side of the steel strip 4, their tracing pins 10 being brought into contact with the rollers 11' to 14' of the lower roller way 6, one after the other.

The axes 17 of the six distance transducers all lie in the same plane, which extends normal to the steel strip 4 and parallel to the moving direction 16. The distances between two distance transducers 7, 8 and 8, 9, and 7', 8' and 8', 9', respectively, each are all equal. The distance between the last-arranged distance transducer 9 (or 9') and the first distance transducer 7 (or 7') is both smaller than the distance between two adjacently arranged strand guiding rollers of a roller way 5 and 6, respectively, and smaller than the circumference of a strand guiding roller.

Figure 2:
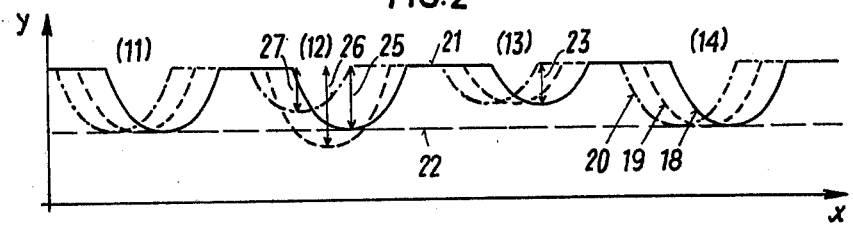
FIG. 2 illustrates a measuring chart of this measuring arrangement.

The electrical connections (not illustrated) of the three inductive distance transducers of one side are each connected to the input of a triple recorder. FIG. 2 shows a measuring chart of such a triple recorder.

While the measuring arrangement is passing by a strand guiding roller, the tracing pins 10 of the inductive distance transducers are actuated one after the other. Since the supporting body (in the resting position) has a larger thickness than the greatest distance of the oppositely arranged roller ways 5, 6, the rollers are set in rotation due to the friction prevailing between the surfaces of the supporting body 1 and the surface areas of the rollers when moving the supporting body 1, so that the rollers are in another angular position at every contact with one of the tracing pins.

In FIG. 2, the curve 18 (in full lines) shows the line of the curve scribed by the recorder allocated to the distance transducer 7. The curves 19 (in broken lines) and the curves 20 (in dot-and-dash lines) were scribed by those recorders which have been allocated to the distance transducers 8 and 9, respectively.

If the tracing pins 10 are between the rollers, the recorders scribe straight lines 21 parallel to the abscissa x of the chart. If a tracing pin 10 is actuated on account of the contact with a roller, the recorder will scribe a curve representing a section of an ellipse. If the tracing pins are actuated by a faultless, true-running roller 11, 13, 14, the vertex heights of all the three ellipses scribed by the recorders allocated to the distance transducers are equal. If the rotation axis of a roller assumes the correct position, the vertices of all the three recorded ellipse sections will touch a set-value straight line 22 that extends parallel to the abscissa x. In the figures this holds for the rollers 11 and 14. The distance between the roller 13 and the roller 13' in FIG. 1 is greater than the ideal distance. The vertex heights 23 of the ellipses scribed by the recorders are lower than the set value (at 22).

With the roller 12, the center of the circular cross-sectional area does not coincide with the rotation axis of the roller 12, but is removed from the same by a distance 24. While the arrangement is moved to pass by the roller 12, the roller 12 is rotated by a frictional engagement at the surface of the strand-like supporting body 1, the tracing pins 10 of the inductive distance transducers 7, 8 and 9 being pressed in one after the other to different extents. Accordingly, the vertex heights 25, 26, 27 of all the three ellipse sections scribed by the triple recorder differ from one another. Thus, it can be drawn from the measuring chart that the roller 12 exhibits a "run-out."

Figure 3:
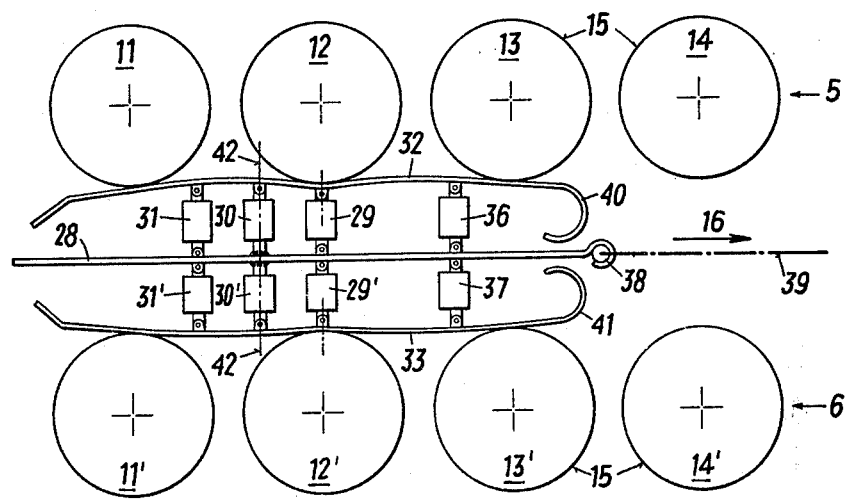
FIG. 3 is an illustration analogous to FIG. 1, of a measuring arrangement according to a second embodiment.
Figure 4:
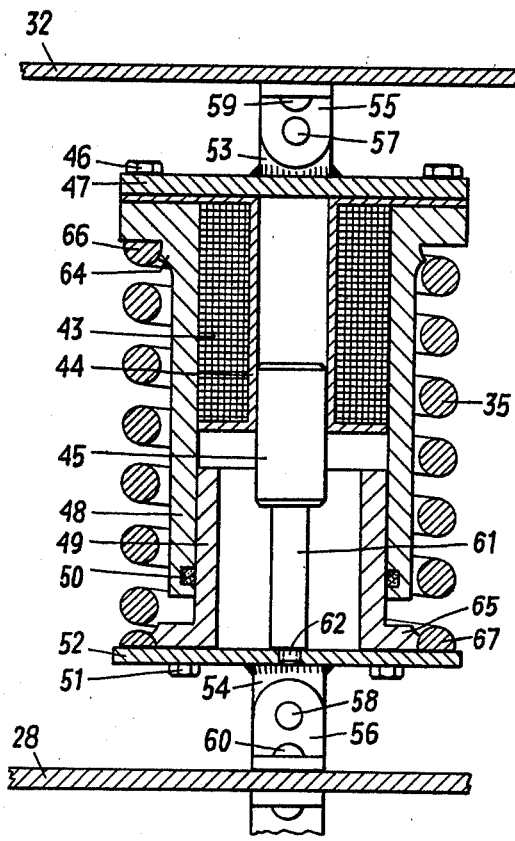
FIG. 4 illustrates a sensor in section.
Figure 5:
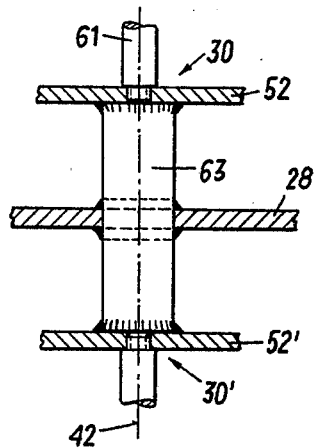
FIG. 5 represents the fastening of a sensor, also in a sectional illustration.

According to the exemplary embodiment illustrated in FIGS. 3 to 5, the measuring arrangement also comprises a middle elastically deformable steel strip 28 representing the neutral line. At this steel strip 28, three sensors 29, 30, 31 are arranged on one side, and three sensors 29', 30', 31' are arranged on the other side. The sensors 29, 30, 31, on the end facing away from the steel strip 28, carry a further steel strip 32. In an analogous manner, the sensors 29', 30', 31' carry a steel strip 33.

The steel strips 32 and 33 are also elastically deformable. As can be seen from FIG. 4, all of the sensors 29 to 31 and 29' to 31' contain pressure springs 35, with the help of which the steel strips 32 and 33 are pressed against the strand guiding rollers 11 to 13 and 11' to 13', respectively. By means of further pressure elements 36 and 37, the front parts of the steel strips 32 and 33 are pressed against the strand guiding rollers.

The middle steel strip 28 on its front end carries a pin 38. To this pin 38 a chain can be fastened, whose central line is denoted by 39 in FIG. 3. With the help of this chain (or of a starter bar), the measuring arrangement can be moved through the strand guide of the continuous casting plant.

The steel strips 32 and 33, on their front ends 40 and 41, respectively, are each inwardly curved in a circularly-arc-shaped manner. These curvatures serve as stops for the middle steel strip 28, in order that the latter cannot move too far out of its central position as the measuring arrangement is moved through a curved roller way.

The middle sensors 30, 30' are rigidly fastened to the steel strip 28 in such a manner that the central lines 42 of these sensors are normal to the central plane of the steel strip 28. The connections of the sensors 29, 29' and 31, 31' as well as of the pressure elements 36, 37, with the steel strips 28, 32 and 33 are designed in an articulate manner. If the measuring device is moved through a curved strand guide, the middle sensors 30, 30' always will be exactly in a radial direction to the strand guide. The remaining sensors, however, deviate from this direction; yet, the deviation is so small that measuring errors thereby caused can be neglected.

FIG. 4 shows the structure of the sensors. Each sensor in its interior carries a coil 43 wound on a coil body 44.

A core 45 is arranged in the coil body 44 to be axially movable. If the core 45 is immersed farther into the coil body 44, the inductance of the coil will increase. The inductance of the coil can be measured at the supply conduits (not illustrated) to the coil 43, representing a measure for the distance between the steel strips 32 or 33, respectively, and the middle steel strip 28.

With the help of screws 46, the coil body 44 is screwed to a plate 47 and a sleeve 48 outwardly surrounding the coil. Into the sleeve 48, a further sleeve 49 is inserted and sealed relative to the same by means of a seal 50 against the penetration of dirt. The sleeve 49 on one end is screwed to a further plate 52 by means of screws 51. The two plates 47 and 52 are pressed apart by the pressure element 35, which is designed as a helical spring and arranged outside of the sleeve 48.

To the outer side of each plate 47 and 52, one bracket 53 and 54, respectively, is each welded. Each of these brackets 53 and 54 is in an articulate connection with a further bracket 55 and 56, respectively, by means of pins 57 and 58, respectively. The brackets 55 and 56 are connected with the steel strips 32 and 28, respectively, by means of rivets 59 and 60, respectively.

The core 45 is supported by a shaft 61 which is screwed into the plate 52 by the aid of a threaded stud 62.

FIG. 5 illustrates the fastening of the middle sensor 30 and 30' to the middle steel strip 28. The fastening is effected by means of a pin 63 which penetrates the steel strip 28 and to whose two ends the sensors 30 and 30' are welded. The pin 63 is welded to the steel strip 28.

Each of the sleeves 48 and 49 has a collar 64 and 65, respectively, which overlaps the end windings 66 and 67 of the helical spring 35, which thus ensures that the measuring arrangement will not fall apart when outside of the strand guide.

The method of evaluating the values measured by the above-described measuring arrangement departs from the fact that a sinusoidal curve of a known wave length is well defined by three defining pieces. The approximate sinusoidal curve representing the sequence of the points of contact between the surface of a roller and the supporting body, seen from the supporting body, can be described by the following system of three equations with three variables:

$$M1 = x \cdot \sin y + z$$

$$M2 = x \cdot \sin\left(\frac{2 \cdot K2}{D} + y\right) + z$$

$$M3 = x \cdot \sin\left(\frac{2 \cdot K3}{D} + y\right) + z$$

Therein are:
M1, M2, M3 ... the measured values of three sensors 1, 2 and 3,
K2, K3 ... the distance between the sensors 2, 3 and the sensor 1,
D ... the diameter of a roller,
x ... the amplitude of the sinusoidal curve,
y ... the phase of the sinusoidal curve,
z ... the displacement of the central line of the sinusoidal curve relative to the abscissa. By conversion, the following solution is obtained:

$$y = \arctan \frac{M2 \sin \frac{2K3}{D} - M3 \sin \frac{2K2}{D}}{\cos \frac{2K2}{D} - \cos \frac{2K3}{D}}$$

$$x = \frac{M1 - M2}{\sin y - \sin\left(\frac{2K2}{D} + y\right)}$$

$$z = M1 - x \cdot \sin y$$

The method of evaluating the measured values thus comprises the following steps:
1. The measured values detected by the sensors and present in analog form are converted into digital values by an analog to digital converter.
2. These digital values are input into a computer in which the values K2, K3 and D have been programmed.
3. The accordingly programmed computer calculates the values x, y and z according to the above formulas.

The value x gives information about the extent of the true-running error of the roller, the value z specifies how far a roller is offset relative to the normal position, the value y gives information about the phase position of a true-running error of a roller.

What I claim is:

1. In a measuring arrangement provided at a roller way formed by rotatably mounted rollers, in particular at a continuous casting plant having oppositely arranged strand guiding rollers, and of the type including a supporting body having a neutral line and adapted to move along said roller way in a moving direction so as to set said rotatably mounted rollers in continuous rotation while in contact with said movable body, and sensors arranged at said supporting body, said rotatably mounted rollers having surface areas coacting with said sensors and said sensors measuring the distance between said surface areas of said rotatably mounted rollers and said neutral line, the improvement wherein said supporting body, on its side facing said roller way, carries at least three sensors arranged at a distance from one another in the direction parallel to said moving direction of said supporting body, said sensors measuring each of said surface areas of said rotatably mounted rollers in subsequent angular positions.

2. An arrangement as set forth in claim 1, wherein said at least three sensors are subsequently arranged along a line extending parallel to said moving direction of said supporting body.

3. An arrangement as set forth in claim 1, wherein said at least three sensors include a first sensor, a second sensor and a third sensor, and wherein the distance between said first sensor and said third sensor, in said moving direction of said supporting body, is smaller than the distance between two neighbouring rollers of said roller way, and the distance between said first sensor and said second sensor and the distance between said second sensor and said third sensor is unequal to half of the circumference of one of said rotatably mounted rollers.

4. An arrangement as set forth in claim 1, wherein said at least three sensors are subsequently arranged at equal distances from one another.

5. An arrangement as set forth in claim 1, wherein the distance between said first of said at least three sensors and the last of said at least three sensors amounts to at most 90% of the distance between two neighbouring rotatably mounted rollers and at most 90% of the circumference of one of said rotatably mounted rollers.

6. An arrangement as set forth in claim 1, wherein said neutral line of said supporting body is formed by a neutral-line steel strip and said sensors are formed by three sensors arranged on each side of said neutral-line steel strip and having ends facing away from said neutral-line steel strip, and which further comprises outer steel strips, one arranged on each side of said neutral-line steel strip and connected with said ends of said three sensors facing away from said neutral-line steel strip, and pressure elements arranged between said neutral-line steel strip and said outer steel strips for pressing said neutral-line steel strip and said outer steel strips apart.

7. An arrangement as set forth in claim 6, wherein one of said three sensors of each side of said neutral-line steel strip is rigidly connected with said neutral-line steel strip and the remaining ones of said three sensors are articulately connected with said neutral-line steel strip, and wherein all of said three sensors of each side of said neutral-line steel strip are articulately connected with said outer steel strips.

8. A method of evaluating the measured values obtained by the sensors of a measuring apparatus provided at a roller way formed by rotatably mounted rollers, such as in a continuous casting plant having oppositely arranged rollers, and of the type including a supporting body having a neutral line and adapted to move along said roller way so as to set said rotatably mounted rollers in continuous rotation while in contact with said movable body and wherein said supporting body on its side facing said roller way carries at least three sensors arranged at a distance from one another in the direction parallel to the direction of movement of said supporting body for sensing each roller at a subsequent angular position, said method comprising the steps of:
  (1) converting the measured values detected by said three sensors into digital values in an analog-to-digital converter;
  (2) establishing the peaks of said measured values; and
  (3) inputting said peaks into a computer for calculating the value of the true-running error and the deviation of the position of the rotation axis of a rotatably mounted roller from the theoretically correct position by solving a system of three equations with three variables.

* * * * *

UNITED STATES PATENT AND TRADEMARK OFFICE
CERTIFICATE OF CORRECTION

PATENT NO. : 4,354,315

DATED : Oct. 19, 1982

INVENTOR(S) : Hans Hecht

It is certified that error appears in the above—identified patent and that said Letters Patent is hereby corrected as shown below:

First page, Item 56, after the first U. S. Patent Document listed, insert --3,983,631  10/1976  Dutzler--.

First page, Item 56, after the first two Foreign Patent Documents listed, insert:

--2427895  12/1974  Federal Republic of Germany
  2639240   2/1978  Federal Republic of Germany--.

Col. 3, line 34, "strands" should read --stands--.

Col. 5, delete line 67.

Col. 6, line 21, "By conversion ..." should start on a separate line at the lefthand margin.

Signed and Sealed this

Eighth Day of February 1983

[SEAL]

Attest:

GERALD J. MOSSINGHOFF

Attesting Officer     Commissioner of Patents and Trademarks